(No Model.)
D. E. KEMPSTER.
BOTTLE, &c.
No. 528,544.　　　　　　　　　Patented Nov. 6, 1894.
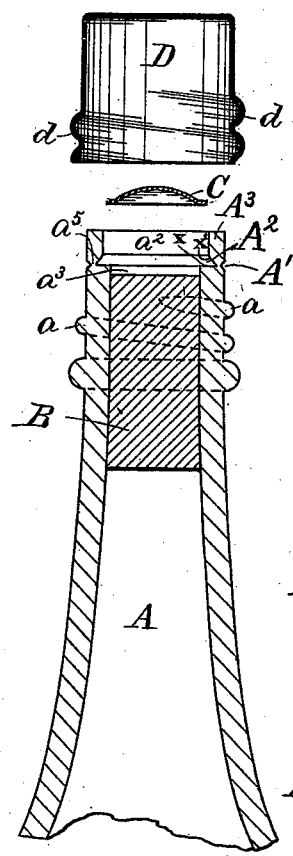
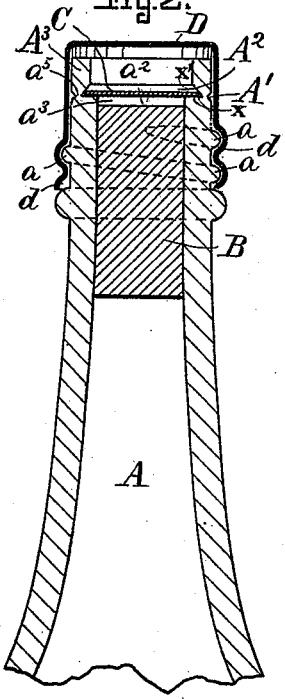
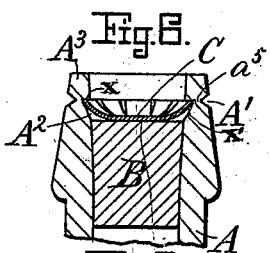
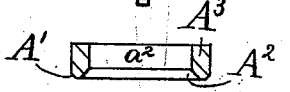
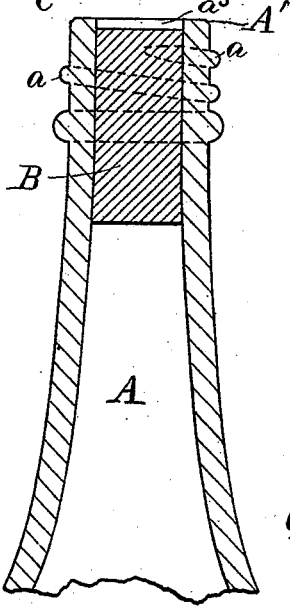
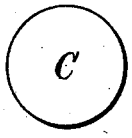
Witnesses
May F. Fuller
Harry N. Squires
Inventor
Daniel E. Kempster
by
Henry Chadbourn
his Atty.
THE NORRIS PETERS CO., PHOTO-LITHO., WASHINGTON, D. C.

UNITED STATES PATENT OFFICE.

DANIEL EDGAR KEMPSTER, OF BOSTON, MASSACHUSETTS, ASSIGNOR, BY DIRECT AND MESNE ASSIGNMENTS, OF ONE-HALF TO HENRY R. THOMPSON AND EDWARD S. BEACH, OF SAME PLACE.

BOTTLE, &c.

SPECIFICATION forming part of Letters Patent No. 528,544, dated November 6, 1894.

Application filed July 12, 1894. Serial No. 517,327. (No model.)

*To all whom it may concern:*

Be it known that I, DANIEL EDGAR KEMPSTER, of Boston, in the county of Suffolk and State of Massachusetts, have invented a certain new and useful Improvement in Bottles or other Vessels, of which the following is a specification, reference being had to the accompanying drawings, in which—

Figure 1 is a sectional view of one form of vessel embodying my invention after being filled and corked, the imperforate, irrefrangible sealing disk and one form of cap being ready to be applied thereto. Fig. 2 is a similar view after the imperforate, irrefrangible sealing disk and a protecting cap have been applied. Fig. 3 is a similar view with the protecting cap removed and the imperforate, irrefrangible sealing disk detached by breaking off the glass ring from the top of the bottle neck on the line of the coincident interior and exterior grooves. Fig. 4 represents the imperforate irrefrangible sealing disk of tough metal cupped and in its preferred form prior to use. Fig. 5 shows said sealing disk after it has been flattened to fit and be fixed securely in the interior groove. Fig. 6 shows a modification in which the horizontal wall is the upper one.

The object of my invention is to produce bottles, jars and other vessels which are adapted to be filled and then corked and sealed in the improved manner hereinafter described so that it is impossible to gain access to the contents of the vessel without first mutilating the vessel near its neck or mouth but in such wise as to leave the mouth between its inner and outer corners smooth and free from jagged projections in order to remove the sealing disk and gain access to the cork, if one be used, and to the contents of the bottle, thus preventing tampering with the contents of the receptacle, and guaranteeing the identity and integrity of the goods while the vessel remains intact. Vessels embodying my invention having been once unstoppered bear permanent evidence of the fact, and insure consumers against spurious goods, but nevertheless the mutilated vessel may be subsequently used for any desired purpose, the absence of the distinguishing characteristic of my new vessel giving warning that the refilled vessel does not contain the original user's goods.

The invention is therefore particularly applicable and desirable in bottles or vessels containing choice and expensive brands of liquor, patent medicines, table sauces, &c., and is so simple and inexpensive as to admit of general use.

While I contemplate embodying my invention in all sorts of vessels of various kinds of materials, and for all sorts of purposes, I describe it herein in connection with a glass bottle which is a convenient form of vessel for the purposes of description.

My invention consists in a bottle, or other vessel, formed with an outlet of the essential characteristics hereinafter described, and also in the combination of such a vessel with an imperforate sealing plate.

In the drawings, A represents the neck of the bottle, A' the exterior groove, and $A^2$ the interior groove. These grooves are coincident in order that that portion (or ring) $A^3$ of the bottle which is above the grooves may be readily and nicely separated from the body of the vessel by a blow or the like.

It is essential to the commercial success of glass vessels embodying my invention that the fractured end of the neck be free from splinters and cutting edges, and I consequently form the interior groove $A^2$ with a horizontal wall $x$ and a wall $x'$ which is inclined inwardly from its junction with side $x$. The horizontal wall $x$ forms a shoulder upon which the sealing plate rests during its expansion into the groove, the interior diameter of the neck being greater below than above the groove. The bottom of the exterior groove is coincident with the bottom of said interior groove, the described configuration of which, in connection with the two different interior diameters referred to constitutes the distinguishing characteristic of my invention and enables me to so nicely fracture the ring from the body of the neck as to adapt the invention for domestic use in which it is essential that the fracture should be smooth and without projections. In Fig. 6, showing a modification, horizontal wall $x$ is above the inwardly sloping wall $x'$.

I have found that the use of the exterior and interior grooves is necessary in order to break off the ring $A^3$ without making a jagged break, and the distinguishing characteristics of my invention are the coincident exterior and interior grooves forming a line of easy fracture.

In Figs. 1, 2, and 3 I have illustrated an exterior cap adapted to be screwed on the bottle neck. This forms a bottle of the catsup style, and is therefore provided with the external screw thread $a$. This form of bottle has two internal diameters at the portions marked respectively $a^2$ and $a^3$. B is a cork (or other suitable stopper), and C represents a cupped imperforate irrefrangible sealing plate of slightly less diameter than the interior diameter of the bottle mouth. After the cork is driven in any suitable manner, the cupped disk C is dropped into the mouth of the bottle over the cork, and is then flattened out, so that its periphery fits the interior groove, as shown in Fig. 2.

The disk C, when in place for expansion, rests on the shoulder formed at the upper end of the portion $a^3$ of the bottle neck, and at the foot of the larger diametric portion $a^2$, so that the shoulder takes the strain when the disk is flattened out to enter the interior groove. In fact, this shoulder has the function of one member of a die, the instrument used to flatten out the disk being the other member of the die. In many forms of bottles this construction is of great importance as it tends to prevent fracture of the web $a^5$ which unites the severable section $A^3$ from the bottle during the bottling and corking operations.

The cap D, having an internal screw-thread $d$ to receive the threads $a$, protects the frangible ring $A^3$, and is desirable in many cases, as the ring $A^3$ is easily broken off because of the frangibility of the web $a^5$ that is formed between the bottoms of the exterior and interior grooves.

In using my improved vessel and preferred form of seal the operation is substantially as follows:—The bottle is filled and corked, and the cupped disk dropped into the neck of the bottle so as to rest over the cork with its convex side uppermost, and the disk is then flattened by pressure and expanded in diameter so as to enter the interior groove and become securely locked in position so as to effectually prevent the removal of the cork without mutilation of the bottle, as indicated in Fig. 3. When it is desired to get at the contents of the bottle, it is only necessary to strike the neck with a slight blow on the section or ring $A^3$, when the glass ring separates from the neck, and releases the sealing plate. The cork may then be removed in the ordinary manner.

By my invention it is impossible to withdraw the sealing plate after it is once fixed in position, and any attempt to force it into the bottle results in its edges exerting a leverage against the upper side of the interior groove, which breaks the glass connection or web $a^5$ and releases the ring and sealing disk as before described.

The sealing plate is made imperforate so that it cannot be picked out of the interior groove when once fixed therein and is made of tough material that is practically irrefrangible so that pressure on the plate, after it is in place, causes the plate to act as a lever and fracture the bottle neck along the line of the coincident interior and exterior grooves. I have found in practice that it is essential to have the exterior and interior grooves coincident at their bottoms in order to rupture the glass at this point without fracturing the main portion of the bottle.

It will be observed that the point of fracture is between the outer and inner walls of the neck, so that the outer and inner corners of the mouth are left substantially smooth.

The metal sealing plate when secured in the interior groove holds the cork so strongly that wiring is unnecessary even in case of champagne and other highly charged liquors.

Broken glass is prevented from entering the receptacle from the fact that the cork is underneath the sealing plate, so that the broken glass may be thrown off before the cork is drawn. The cork and metal sealing-plate may be driven into the neck of the bottle by the plunger of an ordinary bottle-filling machine.

In Fig. 6, showing another modification, the seal is a spring seal, and is sprung into place, its diameter being greater than the interior diameter of the bottle mouth, instead of being normally less than the interior diameter of the bottle mouth as in Figs. 4 and 5. It is proper to say that when the metal seal of the construction and mode of operation shown in Figs. 1, 4 and 5 is used, it should be of soft metal, but when a seal of the form shown in this modification of Fig. 6 is used, it should be of spring metal.

What I claim is—

1. As a new article of manufacture, a bottle or other vessel having a mouth provided with two interior diameters and coincident interior and exterior grooves, the wall of the interior groove being at right angles to a vertical line through the bottle mouth and the wall $x'$ of said groove sloping inwardly and obliquely from its junction with said wall $x$ and the stock of the bottle neck being reduced in thickness at the bottoms of the grooves to form, between the opposed bottoms of the grooves, a thin frangible web, adapted, without fracture of contiguous portions of said neck, to be broken between the inner and outer walls of the neck, substantially as described.

2. The herein described combination of an imperforate metal sealing disk with a bottle having a mouth provided with two interior diameters and coincident interior and exterior grooves, the wall $x$ of the interior groove being at right angles to a vertical line through the bottle neck and the wall $x'$ of said groove sloping inwardly and obliquely from its junction with said wall $x$; the stock of the bottle neck being reduced in thickness at the bottoms of the grooves to form, between the opposed bottoms of the grooves, a thin frangible web adapted, without fracture of contiguous portions of said neck, to be broken between the inner and outer walls of the neck, substantially as described.

DANIEL EDGAR KEMPSTER.

Witnesses:
EDWARD S. BEACH,
A. I. CRAWFORD.